(12) United States Patent
Rosen et al.

(10) Patent No.: US 11,704,683 B1
(45) Date of Patent: Jul. 18, 2023

(54) MACHINE LEARNING SYSTEM, METHOD, AND COMPUTER PROGRAM FOR HOUSEHOLD MARKETING SEGMENTATION

(71) Applicant: Amdocs Development Limited, Limassol (CY)

(72) Inventors: Gil Rosen, Tel Mond (IL); Vivi Miranda, Raanana (IL); Gilli Shama, Ra'anana (IL); Amir Lapid, Givatayim (IL); Eytan Kabilou, Kadima (IL); Ilan Levy, Herzeliya (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 72 days.

(21) Appl. No.: 16/925,199

(22) Filed: Jul. 9, 2020

(51) Int. Cl.
  *G06Q 30/0204* (2023.01)
  *G06N 20/00* (2019.01)
  *H04L 67/306* (2022.01)
  *H04L 43/08* (2022.01)
  *G06N 5/04* (2023.01)

(52) U.S. Cl.
  CPC ........... *G06Q 30/0204* (2013.01); *G06N 5/04* (2013.01); *G06N 20/00* (2019.01); *H04L 43/08* (2013.01); *H04L 67/306* (2013.01)

(58) Field of Classification Search
  None
  See application file for complete search history.

(56) References Cited

U.S. PATENT DOCUMENTS

| | | | |
|---|---|---|---|
| 7,050,555 B2 | 5/2006 | Zargham et al. | |
| 7,698,163 B2 | 4/2010 | Reed et al. | |
| 9,584,335 B1 | 2/2017 | Malasani | |
| 9,819,610 B1 | 11/2017 | Crump et al. | |
| 10,448,204 B2 | 10/2019 | Maloney et al. | |
| 10,536,345 B2 | 1/2020 | Jacobson et al. | |
| 2007/0147247 A1 | 6/2007 | Kalonji et al. | |
| 2008/0082386 A1 | 4/2008 | Cunningham et al. | |

(Continued)

FOREIGN PATENT DOCUMENTS

| | | |
|---|---|---|
| CN | 101902378 A | 12/2010 |
| CN | 101299694 B | 4/2012 |

(Continued)

OTHER PUBLICATIONS

Sunny et al., "Residential Energy Management: A Machine Learning Perspective," 2020 IEEE Green Technologies Conference(GreenTech), Date of Conference: Apr. 1-3, 2020, pp. 229-234 (Year: 2020).*

(Continued)

*Primary Examiner* — Patricia H Munson
*Assistant Examiner* — Chesiree A Walton
(74) *Attorney, Agent, or Firm* — Zilka-Kotab, P.C.

(57) ABSTRACT

As described herein, a machine learning system, method, and computer program provide marketing segmentation of residential spaces. In use, network usage data is collected from each residential network router of a plurality of residential network routers operating in a different residential space of a plurality of residential spaces. Additionally, the network usage data is processed by a machine learning algorithm to segment the plurality of residential spaces into a plurality of segments. Further, the plurality of segments are output.

14 Claims, 6 Drawing Sheets

(56) References Cited

U.S. PATENT DOCUMENTS

| | | | |
|---|---|---|---|
| 2010/0262467 | A1 | 10/2010 | Barnhill, Jr. et al. |
| 2014/0327555 | A1 | 11/2014 | Sager et al. |
| 2015/0347536 | A1 | 12/2015 | Smith |
| 2016/0344873 | A1 | 11/2016 | Jenzeh et al. |
| 2017/0264501 | A1 | 9/2017 | Mathen et al. |
| 2018/0040011 | A1* | 2/2018 | Milton ................. H04W 4/021 |
| 2018/0102032 | A1 | 4/2018 | Emmanuel et al. |
| 2018/0165431 | A1 | 6/2018 | Neumann et al. |
| 2018/0165936 | A1 | 6/2018 | Smith et al. |
| 2018/0183684 | A1 | 6/2018 | Jacobson et al. |
| 2018/0212837 | A1* | 7/2018 | Kalluri ................. H04L 41/147 |
| 2018/0288567 | A1 | 10/2018 | Maloney et al. |
| 2018/0316571 | A1 | 11/2018 | Andrade et al. |
| 2019/0014381 | A1* | 1/2019 | Tidwell ............ H04N 21/41407 |
| 2019/0035244 | A1 | 1/2019 | Garg et al. |
| 2019/0079987 | A1* | 3/2019 | Mayol Ramis ....... G06F 9/5061 |
| 2019/0095478 | A1 | 3/2019 | Tankersley et al. |
| 2019/0097909 | A1 | 3/2019 | Puri et al. |
| 2019/0190848 | A1 | 6/2019 | Zavesky et al. |
| 2019/0363943 | A1 | 11/2019 | De Angelis et al. |
| 2020/0019365 | A1* | 1/2020 | Spooner ................ H04W 4/029 |
| 2020/0104874 | A1* | 4/2020 | Chintakindi ........ G06Q 30/0239 |
| 2020/0210393 | A1* | 7/2020 | Beaver ..................... G06F 17/18 |
| 2021/0199326 | A1 | 7/2021 | Venkatesh et al. |
| 2021/0199328 | A1 | 7/2021 | Venkatesh et al. |
| 2021/0345140 | A1 | 11/2021 | Meingast et al. |
| 2022/0012630 | A1 | 1/2022 | Rosen et al. |
| 2022/0012631 | A1 | 1/2022 | Rosen et al. |

FOREIGN PATENT DOCUMENTS

| | | |
|---|---|---|
| CN | 104504598 A | 4/2015 |
| CN | 103458059 B | 4/2018 |
| CN | 105657073 B | 7/2019 |
| EP | 3457635 A1 | 3/2019 |
| WO | 2016077613 A1 | 5/2016 |
| WO | 2017087285 A1 | 5/2017 |

OTHER PUBLICATIONS

Advisory Action from U.S. Appl. No. 16/925,211, dated Sep. 17, 2021.
International Search Report and Written Opinion from PCT Application No. PCT/IB2021/056149, dated Sep. 23, 2021.
Rosen et al., U.S. Appl. No. 16/925,187, filed Jul. 9, 2020.
Rosen et al., U.S. Appl. No. 16/925,203, filed Jul. 9, 2020.
Rosen et al., U.S. Appl. No. 16/925,211, filed Jul. 9, 2020.
Martin et al., "User-Driven Dynamic Traffic Prioritization for Home Networks," W-MUST'12, Aug. 2012, pp. 19-23.
Bozkurt et al., "Contextual Router: Advancing Experience Oriented Networking to the Home," SOSR'16, Mar. 2016, 7 pages.
Gharakheili et al., "Personalizing the Home Network Experience using Cloud-Based SDN," ResearchGate, Jan. 2014, 7 pages, retrieved from https://www.researchgate.net/publication/312978882_Personalizing_the_home_network_experience_using_cloud-based_SDN.
Fung, B., "How stores use your phone's WiFi to track your shopping habits," The Washington Post, Oct. 19, 2013, 7 pages, retrieved from https://www.washingtonpost.com/news/the-switch/wp/2013/10/19/how-stores-use-your-phones-wifi-to-track-your-shopping-habits/.
Final Office Action from U.S. Appl. No. 16/925,211, dated Jul. 8, 2021.
Non-Final Office Action from U.S. Appl. No. 16/925,211, dated Mar. 30, 2021.
Zhou, X., "Understanding Home Networks with Lightweight Privacy-Preserving Passive Measurement," UKnowledge, Theses and Dissertations, Computer Science, 2016, 135 pages.
International Search Report and Written Opinion from PCT Application No. PCT/IB2021/056148, dated Oct. 12, 2021.
Non-Final Office Action from U.S. Appl. No. 16/925,211, dated Oct. 15, 2021.
Bakhshi et al., "User-Centric Traffic Optimization in Residential Software Defined Networks," IEEE 23rd International Conference on Telecommunications (ICT), 2016, 6 pages.
Final Office Action from U.S. Appl. No. 16/925,211, dated Feb. 11, 2022.
Notice of Allowance from U.S. Appl. No. 16/925,211, dated Jun. 16, 2022.
Notice of Allowance from U.S. Appl. No. 16/925,211, dated Sep. 29, 2022.
Final Office Action from U.S. Appl. No. 16/925,203, dated Dec. 9, 2022.
Final Office Action from U.S. Appl. No. 16/925,187, dated Nov. 18, 2022.
Advisory Action from U.S. Appl. No. 16/925,211, dated May 17, 2022.
Non-Final Office Action from U.S. Appl. No. 16/925,187, dated Jul. 14, 2022.
Corrected Notice of Allowance from U.S. Appl. No. 16/925,211, dated Jul. 1, 2022.
Non-Final Office Action from U.S. Appl. No. 16/925,203, dated Aug. 12, 2022.

* cited by examiner

MACHINE LEARNING SYSTEM, METHOD, AND COMPUTER PROGRAM FOR HOUSEHOLD MARKETING SEGMENTATION

FIELD OF THE INVENTION

The present invention relates to segmentation of users for marketing and other purposes.

BACKGROUND

Typically, segmentation refers to the classification of users into segments for use in marketing (e.g. targeting select advertisements, offers, digital content, digital services, etc. to users by segment) among other uses. Segmentation tools have been developed to aid in the classification of users into segments. To date, these segmentation tools generally segment users by user characteristic(s), and further rely on a wide collection of data. Thus, current segmentation tools have been limited with respect to segmentation at a household level.

There is thus a need for addressing these and/or other issues associated with the prior art.

SUMMARY

As described herein, a machine learning system, method, and computer program provide household marketing segmentation. In use, network usage data is collected from each residential network router of a plurality of residential network routers operating in a different residential space of a plurality of residential spaces. Additionally, the network usage data is processed by a machine learning algorithm to segment the plurality of residential spaces into a plurality of segments. Further, the plurality of segments are output.

DETAILED DESCRIPTION

Figure 1:
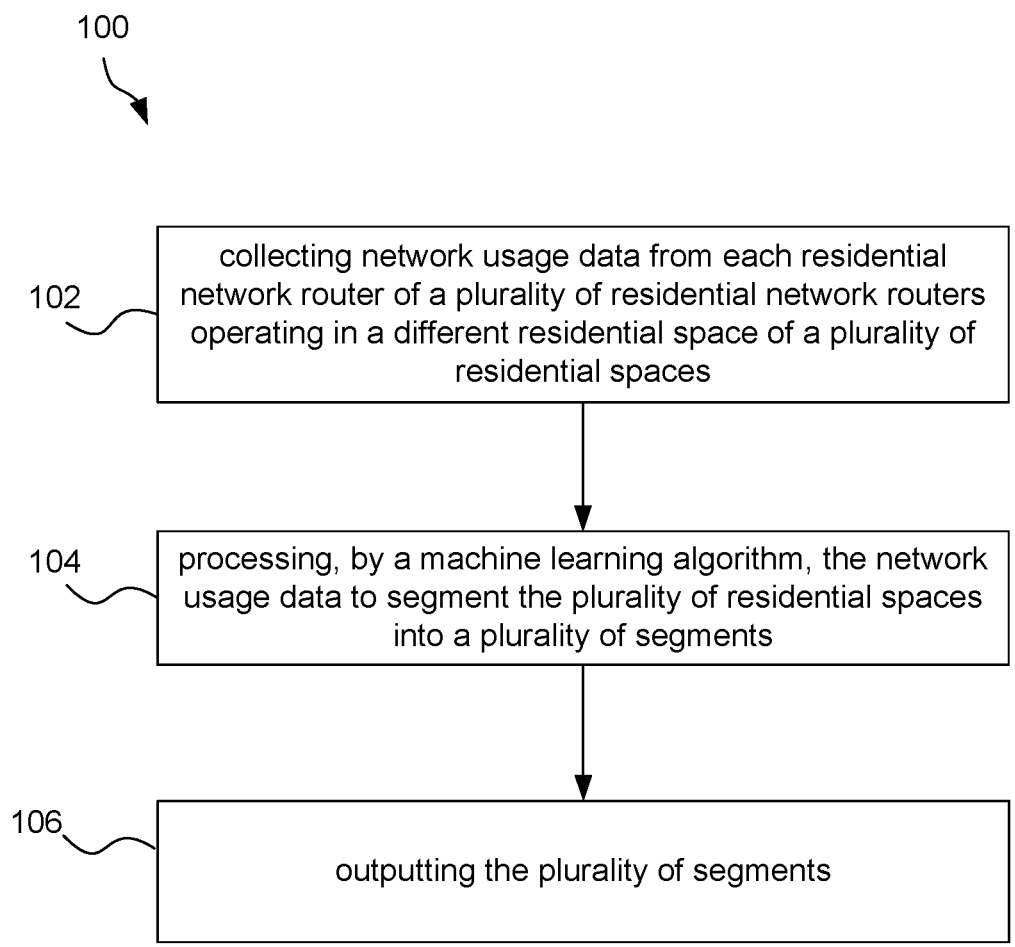
FIG. 1 illustrates a machine learning method for providing marketing segmentation of residential spaces, in accordance with one embodiment.

FIG. 1 illustrates a machine learning method 100 for providing marketing segmentation of residential spaces, in accordance with one embodiment. In one embodiment, the method 100 may be performed by a computer system (e.g. server) or group of computer systems, such as those described below with reference to FIGS. 5 and/or 6. For example, the method 100 may be performed by a cloud processing system in communication with residential network routers via at least one network.

As shown in operation 102, network usage data is collected from each residential network router of a plurality of residential network routers operating in a different residential space of a plurality of residential spaces. Each residential space may be a house, apartment unit, work office, or other residential unit or structure used principally for residential purposes by a substantially unchanging group of people. The residential network router of the residential space is any network router that enables communication between a network (e.g. the Internet) and user devices within and possibly around the residential space. Thus, the residential network router may be located within the residential space, in one embodiment. The user devices may communicate with the residential network router via a second network, such as a local area network (LAN).

As noted above, network usage data is collected from the residential network router of each residential space. The network usage data may be data indicating instances of usage of the network by residents of the residential space, through use of the residential network router, in one embodiment. For each of the instances of usage, the network usage data may include a time of the instance of usage, a duration of the instance of usage, an amount of the instance of usage, a user device associated with (i.e. source of) the instance of usage, a user account associated with the instance of usage, or any other data describing the usage of the network.

In one embodiment, the residential network router may be configured to communicate the network usage data in real time for the real-time collection thereof. In another embodiment, the network usage data may be collected by analyzing communications sent by the residential network router in its normal course of use by the user devices. Of course, it should be noted that the network usage data, which originates from the residential network router, may be collected in any desired manner. Further, the network usage data may be stored for processing, as described below.

Additionally, as shown in operation 104, the network usage data is processed by a machine learning algorithm to segment the plurality of residential spaces into a plurality of segments. The machine learning algorithm may be a deep learning algorithm, neural network, etc. In any case, the machine learning algorithm is trained to segment residential spaces into segments.

By way of example, the machine learning algorithm may aggregate the network usage data by residential space. In addition, the machine learning algorithm may discover the segments from the network usage data. In one embodiment, the segments may be discovered as dense clusters of residential spaces with similar network usage behavior.

Furthermore, the machine learning algorithm may characterize the segments. For example, each segment may be characterized by statistically comparing the segment to a whole population of households, for each of the features used for training, with most significant different features describing the segment. Still yet, for each residential space, the machine learning algorithm may predict an affinity of the residential space to each segment.

Even still yet, for each residential space, the machine learning algorithm may assign the residential space to one segment based on the predicted affinity of the residential space to each segment. The assigning may include verifying stability of the predicted affinity of the residential space to the one segment. For example, the residential space may be assigned to the one segment when the stability of the predicted affinity of the residential space to the one segment is verified.

Further, as shown in operation 106, the plurality of segments are output. In one embodiment, the segments may be output for forecasting future affinity of each residential space to each segment. In one embodiment, the forecasting may be based on predicted future network usage data. In another embodiment, the machine learning algorithm may determine such future affinity.

In another embodiment, the segments may be output for marketing to residents of the plurality of residential spaces, such as including providing marketing content to residents of the plurality of residential spaces. For example, different marketing content (e.g. advertisements, offers, digital content, digital services, etc.) may be correlated with (e.g. assigned to) each of the segments. In turn, residents of a residential space included in a particular segment may be provided with the content correlated with that segment.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In general, a residential network router mediates transmissions between the Internet Service Provider (ISP) and the several residential devices. As part of its network management, this device handles and collects information such as connection details, its performance and equipment information, together with the users' behavior derived from their connected devices' activity.

The embodiments disclosed herein address the need of automated segmentation on households or other residential spaces, including an automated system supporting segmentation, from the automated discovery of segments, though the segments' management over time and adapting affiliation of households to the different segments. The machine learning techniques disclosed herein are enabled, in some embodiments, by new technological advances in the evolution of routers, where specific software agents are installed on the router itself, with the purpose of collecting specific data which can be raw or aggregative to some degree for analysis. These agents are coupled through software to a specific router and can be installed and perform the data collection on any router. The data collected enables collecting more advanced data on the user device level and their activity, from which user related activity and applicative conclusions can be done using machine learning. The data collected is used as input for the machine learning algorithm and process which, in some embodiments, is also specific in nature to the residential router space.

The machine learning algorithm processes home network connection anonymized information of all devices in each household along a period of time, and processes it to marketing valuable household characteristics, to assist marketing decision and action operations. The machine learning algorithm performs analytics on the constantly streaming data, in order to keep a marketing team up to date on market shifts and new trends, rapidly adapting over time. The applied system enables fully automated machine learning based segment management, allowing the marketing team to view the intelligent insights and learn about its market, as well as get involved in decision points to input human expertise and adapt segmentation to a marketing plan. Thus, embodiments of the present disclosure use residential network behavior for the marketing segmentation and further perform automated segment management.

Figure 2:
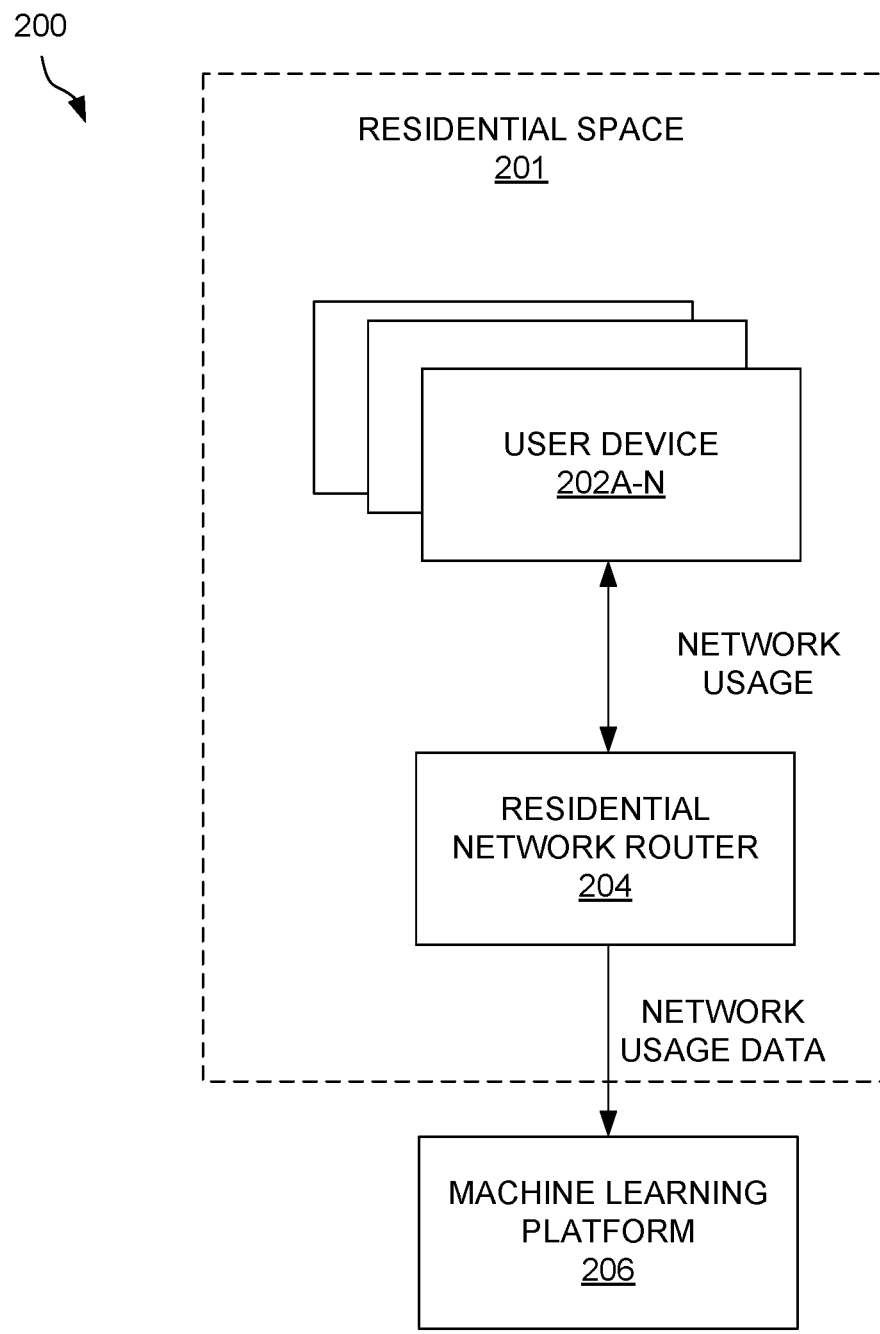
FIG. 2 illustrates a machine learning system for providing marketing segmentation of residential spaces, in accordance with one embodiment.

FIG. 2 illustrates a machine learning system 200 for providing marketing segmentation of residential spaces, in accordance with one embodiment. As an option, the machine learning system 200 may be implemented in the context of the details of the previous figure and/or any subsequent figure(s). Of course, however, machine learning system 200 may be implemented in the context of any desired environment. Further, the aforementioned definitions may equally apply to the description below.

As shown, the system 200 includes at least one user device 202A-N in a residential space 201 that communicates with a residential network router 204 in the residential space 201. The user device 202A-N may be any type of end user device capable of connecting to a network via the residential network router 204. For example, the user device 202A-N may be a mobile phone, tablet, laptop computer, etc. In one embodiment, the user device 202A-N may communicate with the residential network router 204 via another network, such as a LAN.

Additionally, the system 200 includes a machine learning platform 206 in communication with the residential network router 204. The machine learning platform 206 may execute in the cloud, and thus remotely from the residential network router 204, in one embodiment. In this embodiment, the machine learning platform 206 may communicate with the residential network router 204 via the network to which the residential network router 204 provides the user device 202A-N with access.

As shown, the user device 202A-N communicates with the residential network router 204 to access (use) the network. In turn, network usage data related to the network use by the user device 202A-N is collected from the residential network router 204 by the machine learning platform 206. This process is performed by the machine learning platform 206 for a plurality of different residential spaces using the same process and architecture described above. From the network usage data collected from the plurality of different residential spaces, the machine learning platform 206 provides segmentation of the residential spaces.

Figure 3:
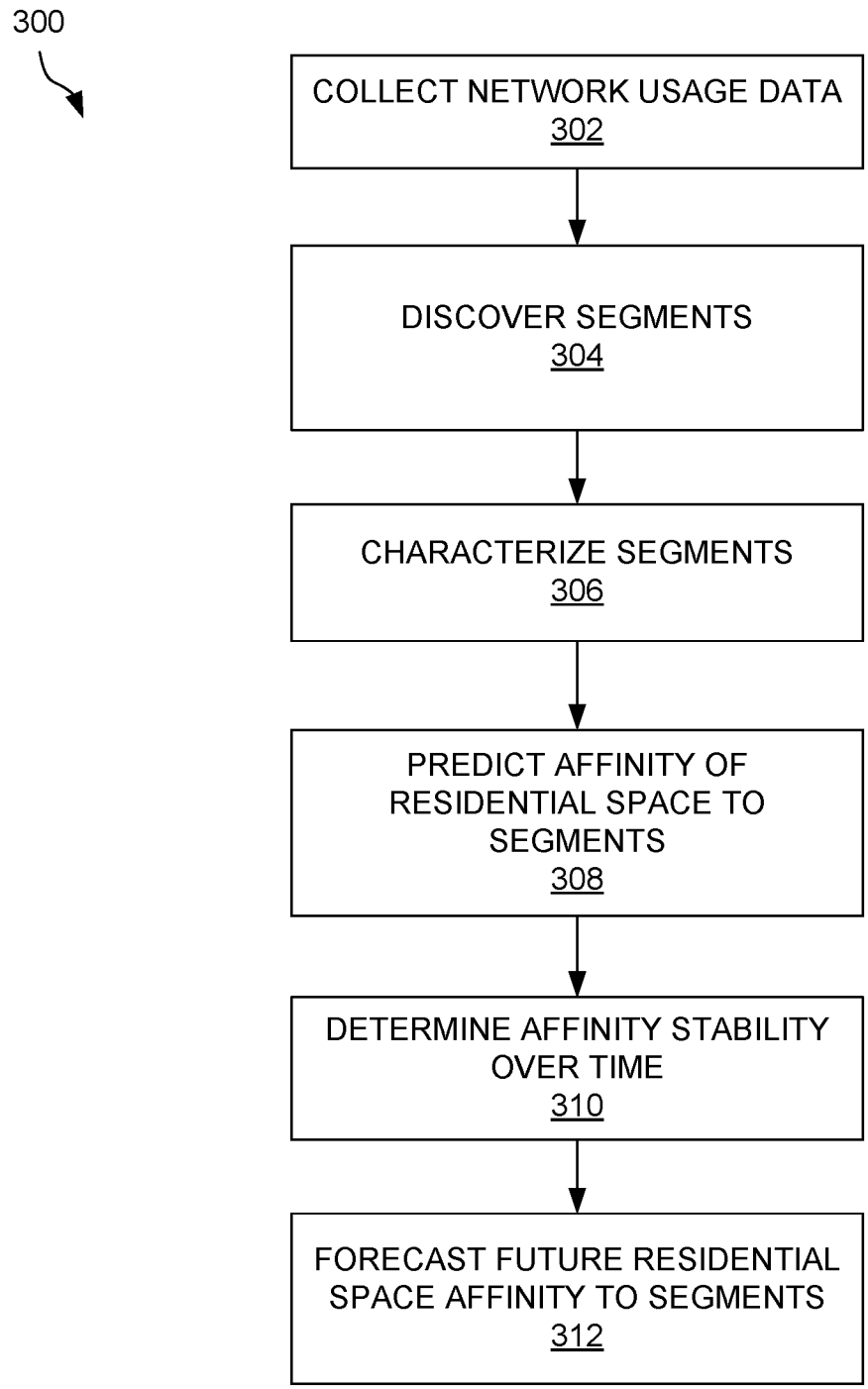
FIG. 3 illustrates a machine learning process for the machine learning platform of FIG. 2, in accordance with one embodiment.

FIG. 3 illustrates a machine learning process 300 for the machine learning platform of FIG. 2, in accordance with one embodiment. Of course, however, the machine learning process 300 may be carried out in the context of any desired environment. Further, the aforementioned definitions may equally apply to the description below.

The machine learning process 300 of the present embodiment processes network connection detailed information of all devices in each household (or other residential space) along time and processes it to determine valuable household characteristics. The preprocessed data is ingested to the segment discovery process, which creates segments, feeds and monitors them, supporting real time segment management. This process 300 has several concatenated steps that perform all aspects of automated segmentation, from the network connection of the single device to the segment affiliation of households and description of the population with its differentiators.

As shown in operation 302, network usage data is collected. This includes the collection of information from different levels, such as the user device with its definitions and its performance, and network consumption data, such as uplink/downlink, throughput, packet, and dropped packets and errors, events related to the bandwidth, according to their frequency and timing. This information is organized, transformed and aggregated to the household level, such that the machine learning process 300 can process it to output discovered valuable market trends on an abstract high-level view, such that the marketer can in turn gain insights and act upon them rapidly.

Next, in operation 304, segments are discovered. This step runs overlapped with clustering machine learning techniques in order to discover dense clusters of households with similar behavior. For example, it may cluster using a Gaussian mixture model (GMM) with overlaps between clusters. A cluster for example can be households with heavy usage in afternoon and night hours, and with 4 and above permanent non-stationary equipment, where another cluster can be households with low quality of experience and multiple Internet of things (IoT) appliances.

Additionally, in operation 306, the segments are characterized. The objective of this step is to explain (e.g. describe) the discovered segments (e.g. to the business user). This component extracts the most important key differentiators of the segment versus the whole population of households (from network usage data), explaining the model and supplying textual insight on the segment's characteristics, easily discernible to the business user's comprehension, enabling fast translation to action.

The segments' profiles can be statistically compared to the whole population on each of the most important features used for training of the machine learning algorithm, where the most significantly different are used to describe the segment, together with its difference sign, such that positive difference is translated to "high" and negative to "low". If the number of segments is low and their size is large enough, then the key differentiators of a segment can be achieved by executing an ensemble tree multiclass classification model to predict per instance the probability to belong to each segment, using the segment association as a label. Then the SHapley Additive exPlanations (SHAP) method is applied to find the main causes for split between segments, and the main causes to assign instances per specific segment. The segment description can be a combination of the top outlying causes to assign instances per this specific segment.

At this point, the business user can decide which segments are of his interest and enhance the company's business targets. However, in another embodiment the business user may define segments according to some parameters related to the profiles which are then added as manual segments to the list of managed ones discovered in operation 304.

Figure 4A:
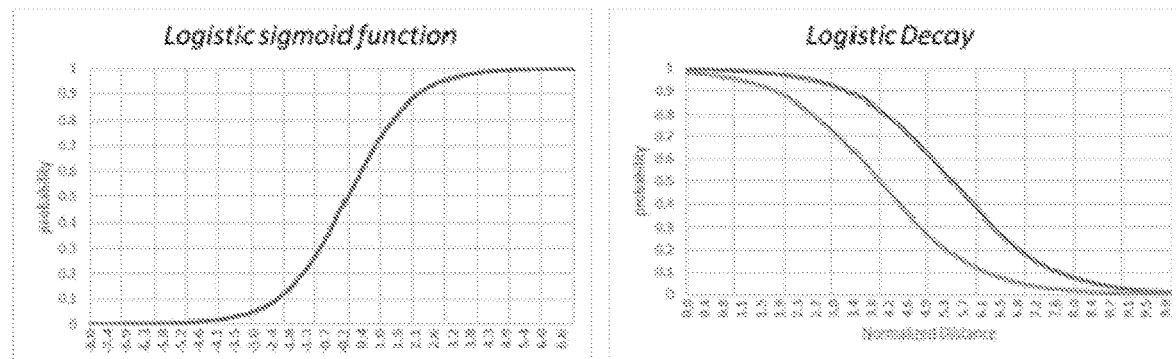
FIG. 4A illustrates logistic decay used to predict an affinity of a residential space to a marketing segment, in accordance with one embodiment.

Further, in operation 308, affinity of each residential space to each segment is predicted. The segments may overlap by definition, hence, the need to assign the household that belong to each of them at each point in time. In this step, the probability of each household to pertain to the segment is calculated, based on its Euclidean distance to it. The probability is defined to decrease with log-logistic decay, such that closer points to the centroid have a much higher probability and rapidly decreases to low probability (see FIG. 4A). This way we can control the size of the segment with one parameter in the decay equation, to be learned with training pre-labeled data in a testing environment and depending on the variance of the segment population.

In operation 310, affinity stability for each residential space is determined. One of the greatest concerns while applying automated segmentation is for the algorithm to overlook the single household, hence associated a household to a segment and dissociating it from the segment the next day, and so forth. From the business perspective, when the phenomena studied is a steady trait of the household, then it is of outmost importance that affinity to its segment is stable, unless a significant drift occurred, where, if a household is excluded, this should also be a stable decision.

Figure 4B:
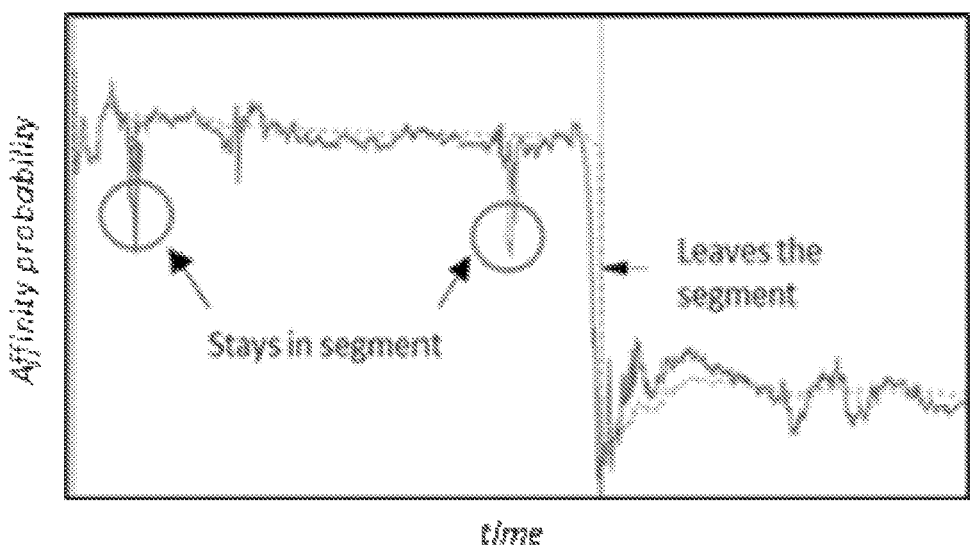
FIG. 4B illustrates affinity stability of a predicted affinity of a residential space to a marketing segment, in accordance with one embodiment.

For these purposes the time series of affinity probabilities of each household is collected over a period of time, and change point analysis is performed on the series to detect the significant changing points that differentiate between outliers and actual behavior drifts (see FIG. 4B). The changing point is selected as a drift from the whole segment's behavior, constrained by the fact that the affinity probability is analyzed, which depends on the distribution of the whole population of the segment. This means that if the population of the segment is moving in some direction as a cluster, the affinity probability would not be impacted, and a household moving in the same direction won't be excluded from the cluster, as opposed to a household drifting apart in a different direction. It is assumed that the segments themselves are relatively stable, otherwise, if the whole group shifts chaotically, there will not be any stability achieved at this step. This assumption can be ensured in the second step, where while discovering segments, minimum quality thresholds are required to publish (discover) a segment. This work claims resolving stability of the single household regarding its association to a segment, which itself evolves over time.

Moreover, in operation 312, future residential space affinity to segments is forecasted. After segments were defined over time, patterns of the journey of a household over time are identified, such that the affinity to each segment can be forecasted in the future, based on the predicted future network consumption trends (predicted network usage data). The predicted affinity can feed a recommender system, to supply additional predicted knowledge to enhance a marketing plans' success. For example the future residential space affinity can be used to predict:

Household increases chance of joining "heavy gamers with multiple gaming devices";

Household increases streaming volume in Netflix and expected to join "heavy Netflix streamers"; or Household with "high Social Media activity at late hours" expected to exit segment.

An additional application of the affinity forecast is aggregating and discovering common significant "journeys" along the different segments. These journeys can enhance the prediction of the next segment affinity, and guide the marketing team to new promotions, offerings, etc.

To this end, the embodiments described above perform automated segment discovery, design and management, substantially driven by machine learning algorithms to discover the segments, select its population and track the segment behavior. The embodiments described above do not apply or track any marketing plans, but if these plans influence the behavior, then the system automatically adapts to this shift, without misplacing the single household outside the segment, unless it drifted differently than the rest of its segment.

Moreover, the embodiments described above are not induced by the business case of the marketer, but instead discover traits that are may be unknown to him. It delivers the discovered segments in a friendly, textual, understandable message, and it withstands the non-stationary characteristic of the effects affecting household market behavior and shift.

In addition, the embodiments described above:

Rely solely on network connection data collected by the router, and not on network usage and customer data from the Internet Service Provider, or any other information from any external source, discarding the need of integration and external sources' update management;

Automatically and rapidly adapts to market trends and shifts, on the market and on the segment level;

Cooperates with the marketer through an iterative ongoing automated and machine learning led adaptive process, where the marketer can utilize the created addressable market segments with the guidance of machine learning to even granular level of specific segments of customers, and the customers' journey over time. The application of machine learning algorithms assist the marketer's effort and saves manual analysis work, allowing better time-to-market action and reaction.

The actionable outcome of belonging to a segment can be directly connected to the household user quality of experience with the router.

Figure 5:
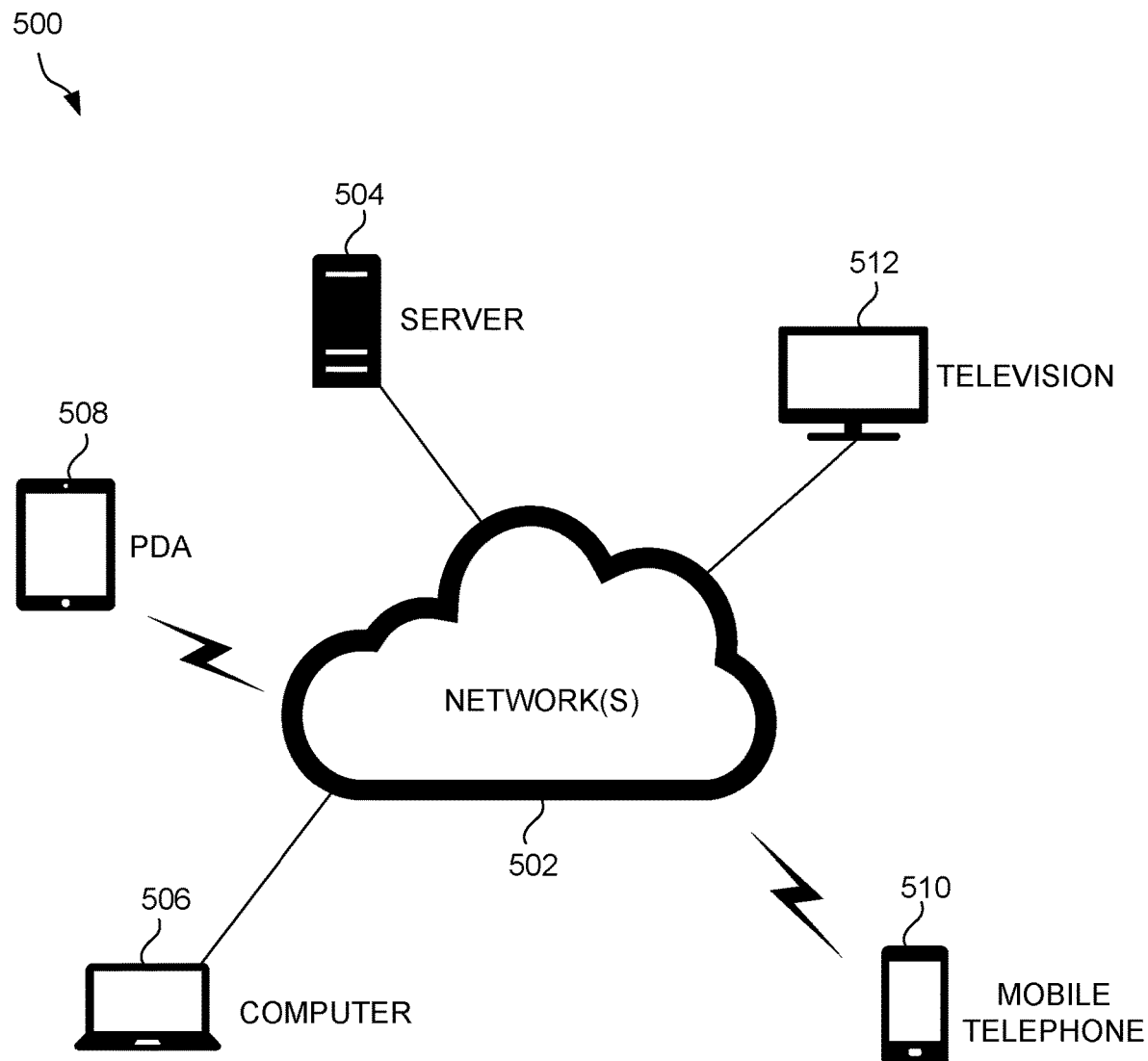
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
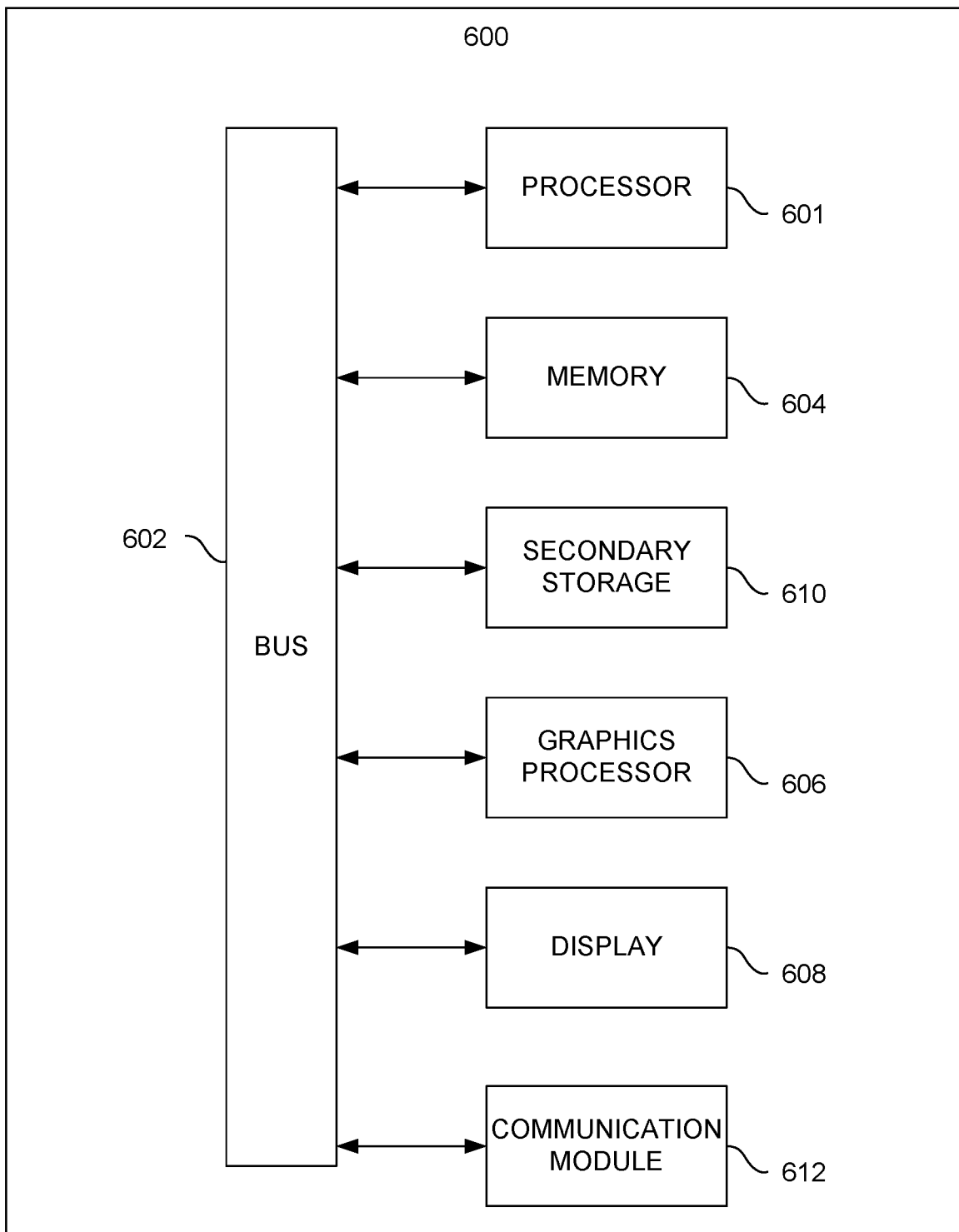
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
   collecting, by a system, network usage data from each residential network router of a plurality of residential network routers operating in a different residential space of a plurality of residential spaces, wherein each residential network router of the plurality of residential network routers is configured to aggregate raw usage data into the network usage data and to communicate the network usage data to the system;
   processing, by a machine learning algorithm of the system, the network usage data to segment the plurality of residential spaces into a plurality of segments, wherein the machine learning algorithm:
      discovers the plurality of segments as dense clusters of residential spaces with similar network usage behavior, and
      characterizes each segment of the plurality of segments according to residential space features that are key differentiators for the segment,
      predicts an affinity of each residential space of the plurality of residential spaces to each segment of the plurality of segments, and
      assigns each residential space of the plurality of residential spaces to one segment of the plurality of segments based on the affinity of the residential space to each segment of the plurality of segments, including verifying stability of the affinity of the residential space to the one segment of the plurality of segments,
   wherein the stability is verified by:
      collecting a time series of affinity probabilities of each household over a period of time,
      performing a change point analysis on the time series to detect significant changing points that differentiate between outliers and actual behavior drifts, and
      selecting a changing point as a drift from segment behavior; and
   for at least one segment of the plurality of segments:
      determining, by the system, at least one of a digital content or a digital service correlated with the segment,
      determining, by the system, the residential spaces assigned to the segment by the machine learning algorithm, and
      providing, by the system, the at least one of the digital content or the digital service to residents of the residential spaces assigned to the segment.

2. The non-transitory computer readable medium of claim 1, wherein the network usage data is data indicating instances of usage of a network by residents of the residential space.

3. The non-transitory computer readable medium of claim 2, wherein for each of the instances of usage, the network usage data includes at least one of a time of the instance of usage, a duration of the instance of usage, an amount of the instance of usage, a user device associated with the instance of usage, or a user account associated with the instance of usage.

4. The non-transitory computer readable medium of claim 1, wherein the network usage data is collected in real-time.

5. The non-transitory computer readable medium of claim 1, further comprising:
   storing the network usage data.

6. The non-transitory computer readable medium of claim 1, wherein each segment of the plurality of segments is characterized by statistically comparing the segment to a whole population of households, for each of a plurality of residential space features used for training the machine learning algorithm.

7. The non-transitory computer readable medium of claim 1, wherein predicting the affinity of each residential space to each segment includes calculating a probability of the residential space to pertain to the segment, based on a Euclidean distance between the residential space and the segment.

8. The non-transitory computer readable medium of claim 1, wherein the residential space is assigned to the one segment of the plurality of segments further when the stability of the predicted affinity of the residential space to the one segment of the plurality of segments is verified.

9. The non-transitory computer readable medium of claim 1, wherein the plurality of segments are output for forecasting future affinity of each residential space of the plurality of residential spaces to each segment of the plurality of segments.

10. The non-transitory computer readable medium of claim 1, wherein the forecasting is based on predicted future network usage data.

11. The non-transitory computer readable medium of claim 1, wherein the system is a cloud processing system in communication with the plurality of residential network routers via at least one network.

12. The non-transitory computer readable medium of claim 1, further comprising:
  training the machine learning algorithm to segment residential spaces into segments according to a plurality of residential space features.

13. A method, comprising:
  collecting, by a system, network usage data from each residential network router of a plurality of residential network routers operating in a different residential space of a plurality of residential spaces, wherein each residential network router of the plurality of residential network routers is configured to aggregate raw usage data into the network usage data and to communicate the network usage data to the system;
  processing, by a machine learning algorithm of the system, the network usage data to segment the plurality of residential spaces into a plurality of segments, wherein the machine learning algorithm:
    discovers the plurality of segments as dense clusters of residential spaces with similar network usage behavior, and
    characterizes each segment of the plurality of segments according to residential space features that are key differentiators for the segment,
    predicts an affinity of each residential space of the plurality of residential spaces to each segment of the plurality of segments, and
    assigns each residential space of the plurality of residential spaces to one segment of the plurality of segments based on the affinity of the residential space to each segment of the plurality of segments, including verifying stability of the affinity of the residential space to the one segment of the plurality of segments,
  wherein the stability is verified by:
    collecting a time series of affinity probabilities of each household over a period of time,
    performing a change point analysis on the time series to detect significant changing points that differentiate between outliers and actual behavior drifts, and
    selecting a changing point as a drift from segment behavior; and
  for at least one segment of the plurality of segments:
    determining, by the system, at least one of a digital content or a digital service correlated with the segment,
    determining, by the system, the residential spaces assigned to the segment by the machine learning algorithm, and
    providing, by the system, the at least one of the digital content or the digital service to residents of the residential spaces assigned to the segment.

14. A system, comprising:
  a non-transitory memory storing instructions; and
  one or more processors in communication with the non-transitory memory that execute the instructions to perform a method comprising:
  collecting, by the system, network usage data from each residential network router of a plurality of residential network routers operating in a different residential space of a plurality of residential spaces, wherein each residential network router of the plurality of residential network routers is configured to aggregate raw usage data into the network usage data and to communicate the network usage data to the system;
  processing, by a machine learning algorithm of the system, the network usage data to segment the plurality of residential spaces into a plurality of segments, wherein the machine learning algorithm:
    discovers the plurality of segments as dense clusters of residential spaces with similar network usage behavior, and
    characterizes each segment of the plurality of segments according to residential space features that are key differentiators for the segment,
    predicts an affinity of each residential space of the plurality of residential spaces to each segment of the plurality of segments, and
    assigns each residential space of the plurality of residential spaces to one segment of the plurality of segments based on the affinity of the residential space to each segment of the plurality of segments, including verifying stability of the affinity of the residential space to the one segment of the plurality of segments,
  wherein the stability is verified by:
    collecting a time series of affinity probabilities of each household over a period of time,
    performing a change point analysis on the time series to detect significant changing points that differentiate between outliers and actual behavior drifts, and
    selecting a changing point as a drift from segment behavior; and
  for at least one segment of the plurality of segments:
    determining, by the system, at least one of a digital content or a digital service correlated with the segment,
    determining, by the system, the residential spaces assigned to the segment by the machine learning algorithm, and
    providing, by the system, the at least one of the digital content or the digital service to residents of the residential spaces assigned to the segment.

* * * * *